United States Patent [19]

Berner et al.

[11] Patent Number: 5,050,667

[45] Date of Patent: Sep. 24, 1991

[54] AIR VENTILATION AND HEAT EXCHANGE APPARATUS

[76] Inventors: Erling Berner, Loretohohe 5, CH-6300 Zug, Switzerland; Rolf E. Berner, R.D. #6, New Castle, Pa. 16103

[21] Appl. No.: 523,612

[22] Filed: May 15, 1990

[51] Int. Cl.⁵ .............................................. F28D 17/02
[52] U.S. Cl. .......................................... 165/4; 165/97; 165/137; 165/54
[58] Field of Search ...................... 165/4, 97, 122, 137, 165/54

[56] References Cited

U.S. PATENT DOCUMENTS 3,941,185  3/1976  Henning ................................. 165/97
4,744,409  5/1988  Berner .

FOREIGN PATENT DOCUMENTS 853202  10/1952  Fed. Rep. of Germany ...... 165/137

Primary Examiner—Albert W. Davis, Jr.
Attorney, Agent, or Firm—Kirkpatrick & Lockhart

[57] ABSTRACT

An apparatus is provided which combines in a single, relatively compact housing the necessary components to efficiently exchange stale room air with fresh outside air. The apparatus includes a single, continuous duct having openings at each end. A heat storing matrix is disposed within the duct. A fan is also placed within the duct. The fan is capable of producing a substantially axial air flow through the duct. The fan is moveable between two positions: a first position wherein air flow is in a direction from the first end to the second end of the duct and a second position wherein air flow is reversed. The apparatus includes means for moving the fan from the first position to the second position such as a solenoid.

6 Claims, 5 Drawing Sheets

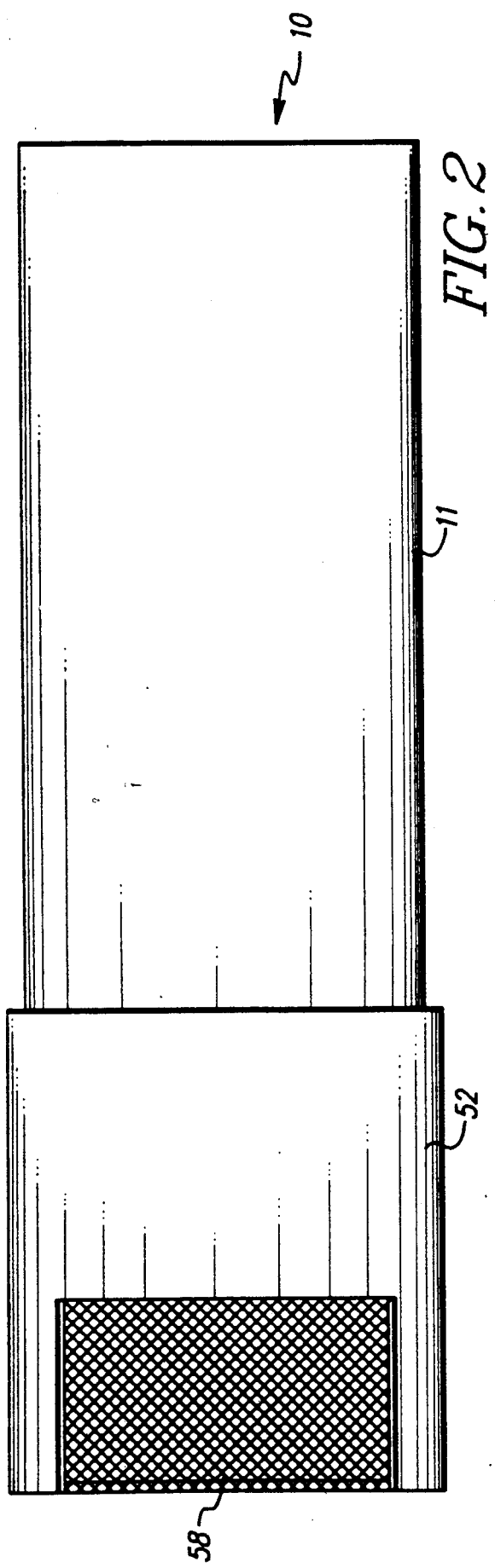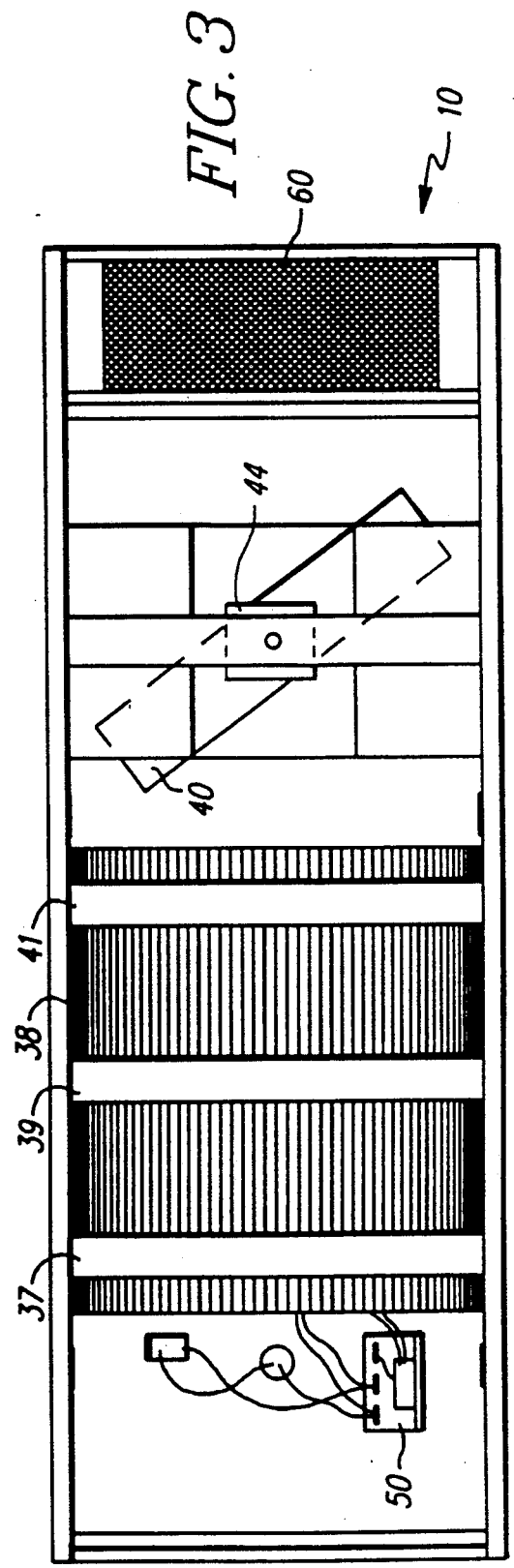

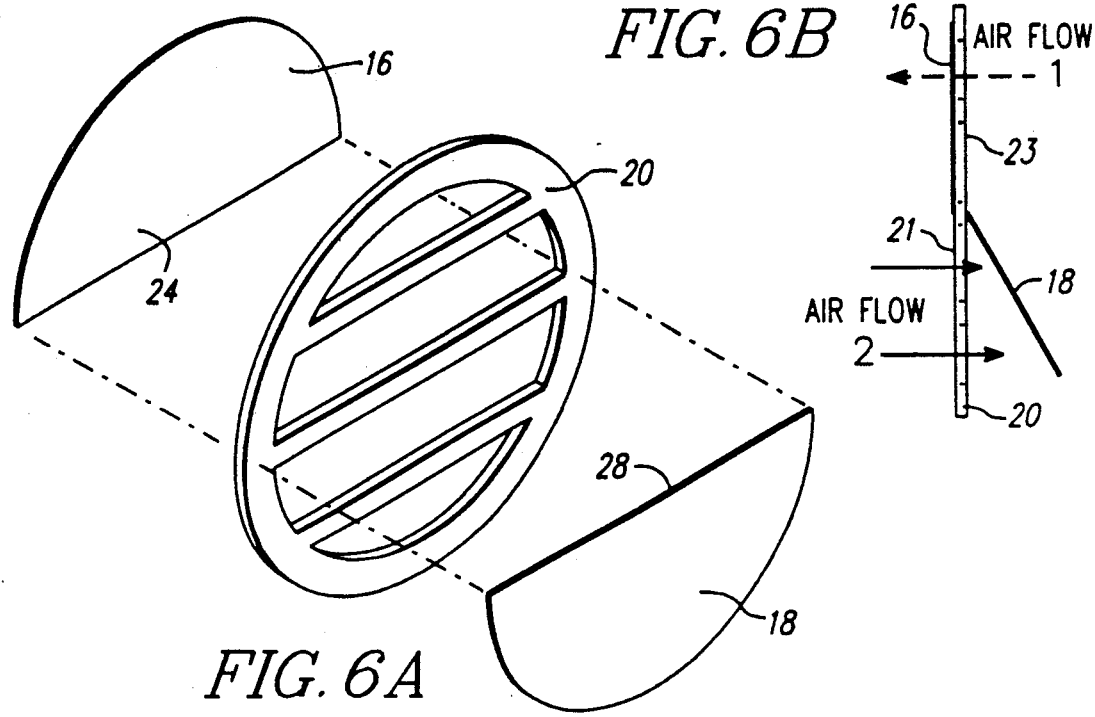
FIG. 6B
FIG. 6A
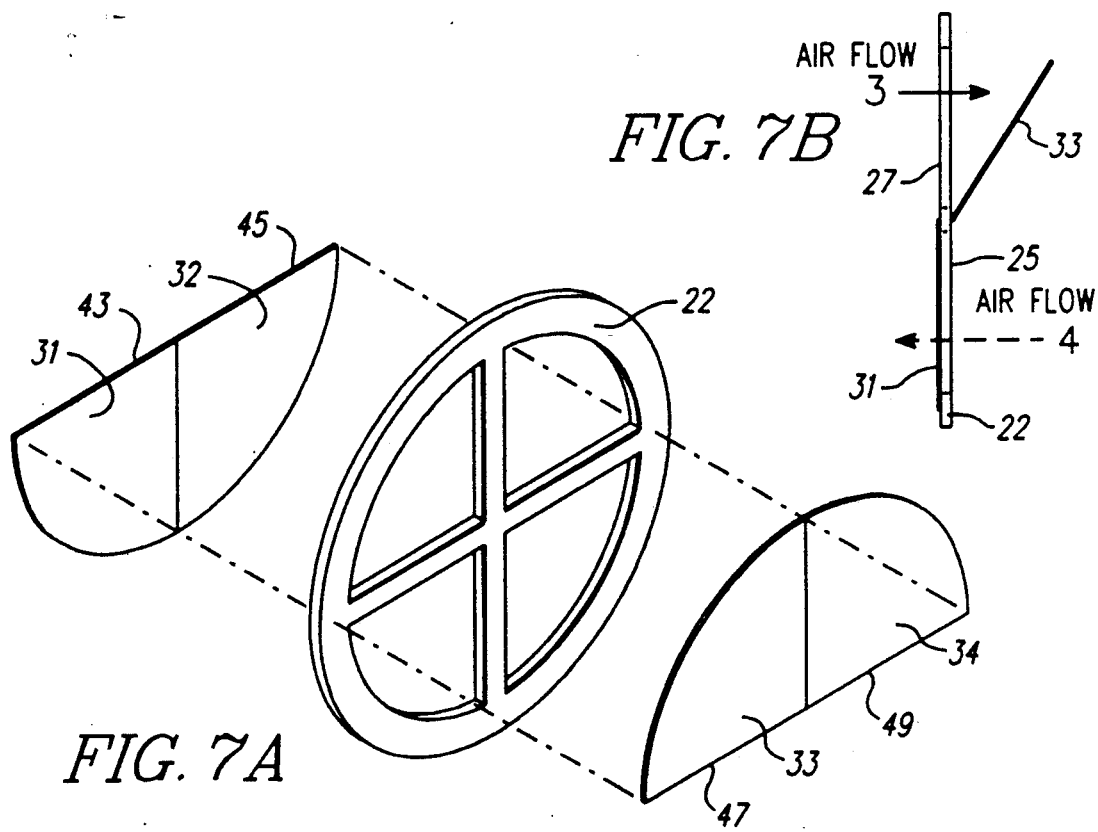
FIG. 7B
FIG. 7A

AIR VENTILATION AND HEAT EXCHANGE APPARATUS

BACKGROUND OF THE INVENTION

1. Field of the Invention

This invention relates to an apparatus for exchanging room air with fresh outside air and for recovering a high percentage of the thermal energy by means of a heat recovering matrix. Additionally, in accordance with the invention, when it is desired to prevent humidity from entering or exiting an enclosure, the heat recovering matrix can be replaced with a matrix which is also latent moisture recovering whereby energy is also saved by the latent heat recovery.

2. Description of the Prior Art

Various apparatuses for exchanging air within a room or other enclosure with fresh outside air are known. With the increased emphasis on constructing tightly-sealed buildings and homes for energy conservation purposes, there has developed a corresponding awareness of the need to exhaust stale (and possibly toxic) room air and replace it with fresh outside air. In the wintertime, one of the problems associated with such an exchange is the introduction of cool drafts caused by the sudden influx of colder air from the outside. Another problem is the loss of heat energy along with the exhausted air. These problems essentially have been solved by the use of some form of heat exchange device which alternately stores heat given up by the exhausted air and heats the fresh air being supplied from the outside. In the summertime, it is essential to keep the warm and humid air outside the building. Accordingly, a latent and sensible heat storing matrix should be used which is capable of storing both heat and moisture.

However, air exchanging apparatuses in the prior art have been complex and relatively large in size having several channels and/or rotating heat exchangers as shown in U.S. Pat. No. 4,727,931, entitled Air Exchanging Apparatus and Method, issued Mar. 1, 1988. Another problem with air exchanging apparatuses of the prior art is that they have channels with bends or curves in them which results in undesirable pressure drops from one end of the channel to the other necessitating large fans with high energy consumption and which make the apparatus difficult to clean and service. Additionally, such exchangers require two or more fans to efficiently exchange the air inside an enclosure with outside air.

We have found that it is therefore desirable to have an air exchanging apparatus which is simple, compact and relatively inexpensive to manufacture and which can be easily cleaned and serviced. We also believe that it is also desirable to have an air exchanging apparatus which has only one continuous duct which can be straight if desired and only one fan. The energy consumption can thus be kept to a minimum.

Another problem with ducts used for ventilation is that if condensation occurs, bacteria can grow inside the ducts, and can be blown into the room. Therefore, it is necessary to be able to easily clean the ducts of an air ventilation apparatus. Air ventilation apparatuses of the prior art are difficult to clean.

SUMMARY OF THE INVENTION

The present invention combines in a single, relatively compact housing the necessary components to efficiently exchange stale room air with fresh outside air. The apparatus includes a single, continuous duct having openings at each end. A heat storing matrix is disposed within the duct. The heat storing matrix can also include a moisture storing capability. A fan is also provided within the duct. The fan is capable of producing a substantially axial air flow through the duct. In addition, the fan is moveable between two positions, namely a first position wherein the air flow is in a direction from one end of the duct to the other end of the duct and a second position wherein the air flow is reversed. The present apparatus further includes means for quickly moving the fan from the first position to the second position such as a solenoid.

In order to reach maximum efficiency for the heat storing matrix, the air flow should reverse every 2 to 6 seconds depending on the construction of the heat storing matrix. The heat storing matrix also acts as a noise damper.

In one embodiment, the apparatus includes valves which prevent the mixing of exhausted air and air taken into the duct. Filters and screens can be placed adjacent to such valves which prevent undesirable gases and particulates from entering the apparatus.

In another embodiment, two air exchanging apparatuses are placed adjacent one another. Each duct includes a fan disposed therein sharing a common axis. If desired, a single solenoid can be used to control the rotation of both fans. A single heat storing matrix can be utilized for both ducts. Preferably, the air in one of the ducts flows in a direction opposite the air flow in the other. In the manner, a large volume of air can be exchanged without significantly altering the air pressure within the enclosure.

The apparatus can be constructed in such a manner so that the fan and heat storage matrix can be removed through either end of the duct to facilitate cleaning and servicing of the apparatus.

These and other advantages and benefits of the present invention will become apparent from the Detailed Description of the Present Preferred Embodiments hereinbelow.

DESCRIPTION OF THE DRAWINGS

For the present invention to be readily practiced and easily understood, it will be described, by way of example only, in conjunction with a preferred embodiment in which:

FIG. 2 is a bottom view of the air exchange apparatus of the present invention;

FIG. 3 is a cut away view of the air exchange apparatus of the present invention having the upper half of the duct removed;

FIG. 6A is a perspective view of an end piece of the present invention;

FIG. 6B is a side view of one end piece of the present invention;

FIG. 7A is a perspective view of another end piece of the present invention;

FIG. 7B is a side view of an end piece of the present invention; and

DETAILED DESCRIPTION OF THE PRESENT PREFERRED EMBODIMENT OF THE INVENTION

FIGS. 1-8 illustrate a preferred embodiment of the present invention.

Figure 1:
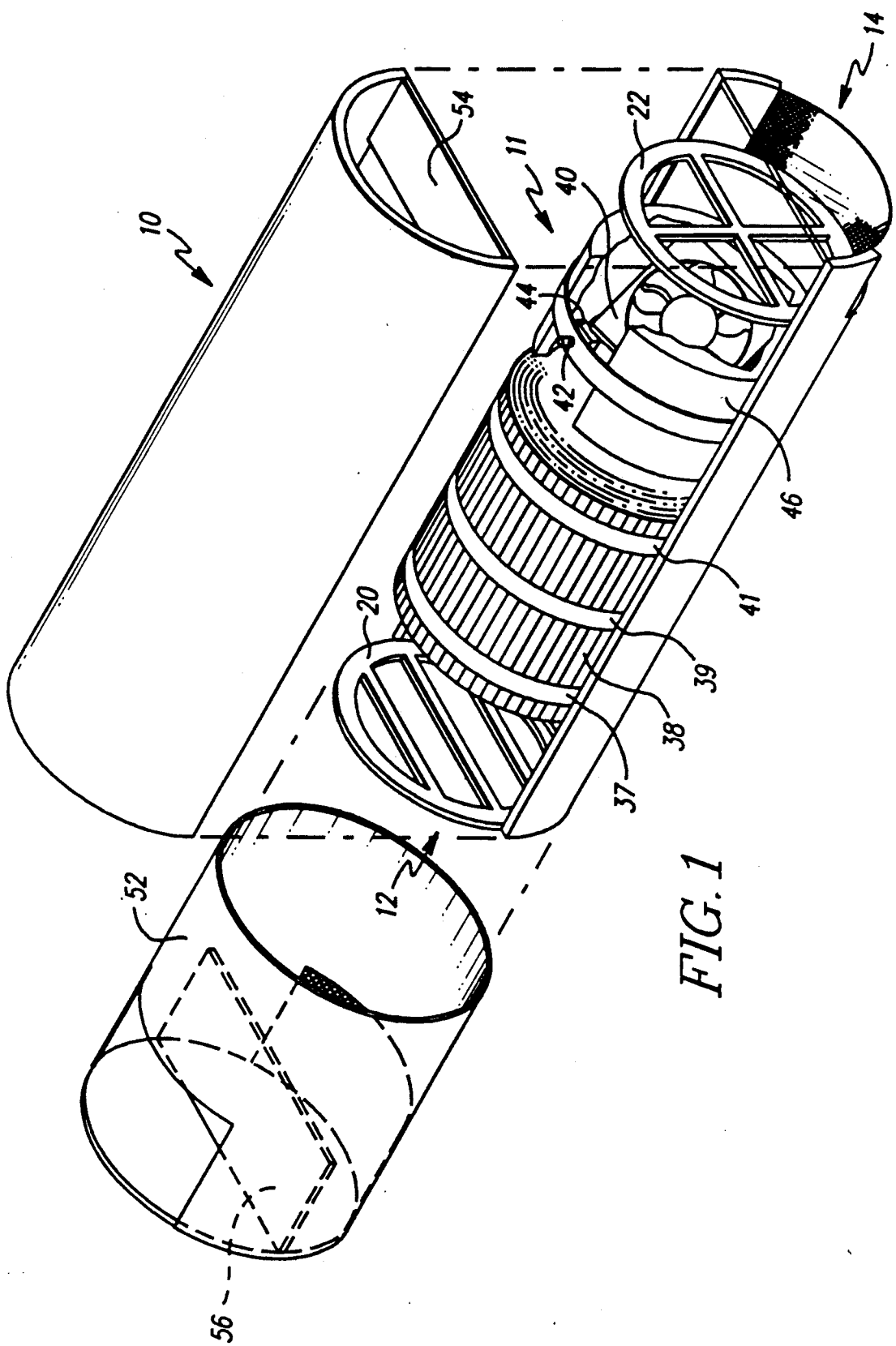
FIG. 1 is a perspective exploded view of the air exchange apparatus of the present invention.
Figure 4:
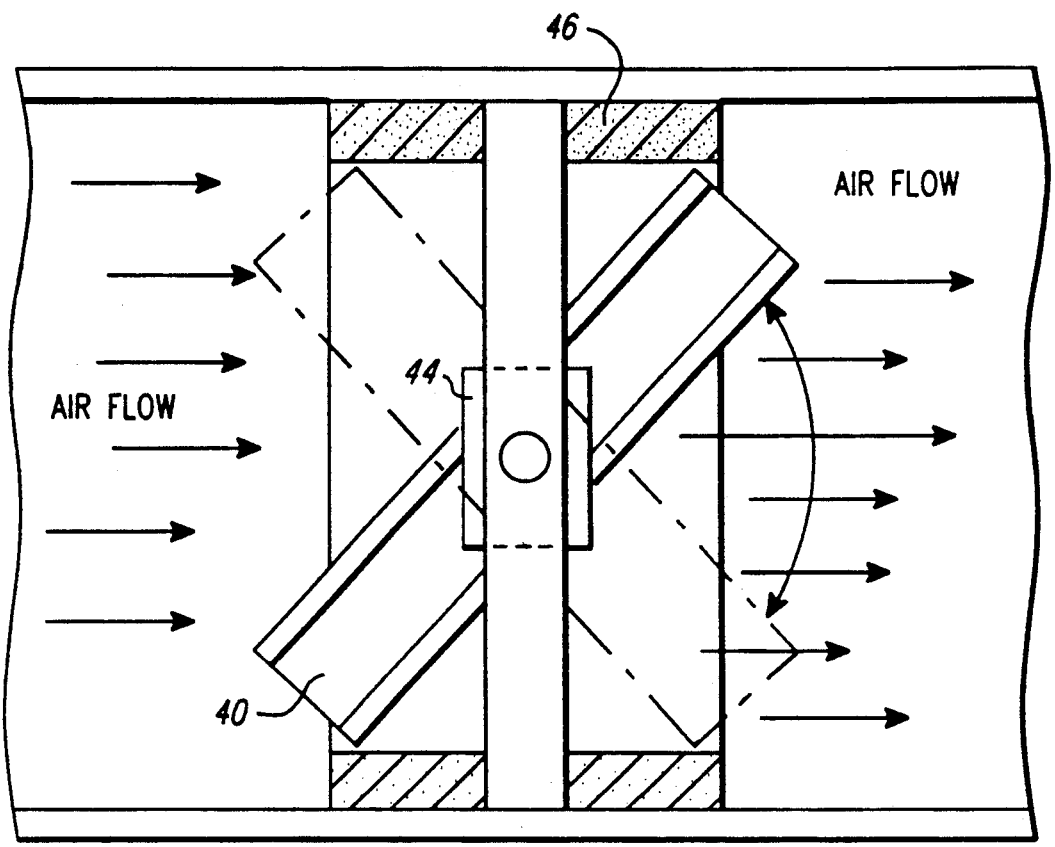
FIG. 4 is a view of the fan of the present invention in the exhaust mode.
Figure 5:
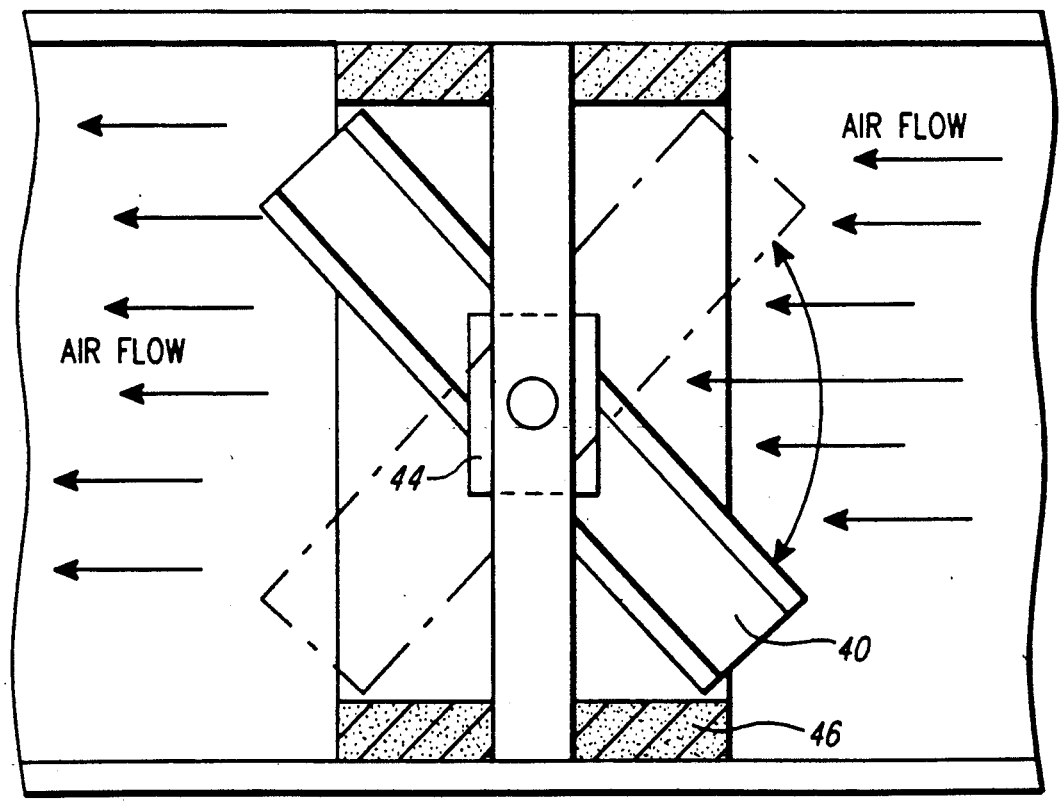
FIG. 5 is a view of the fan of the present invention in the intake mode.
Figure 8:
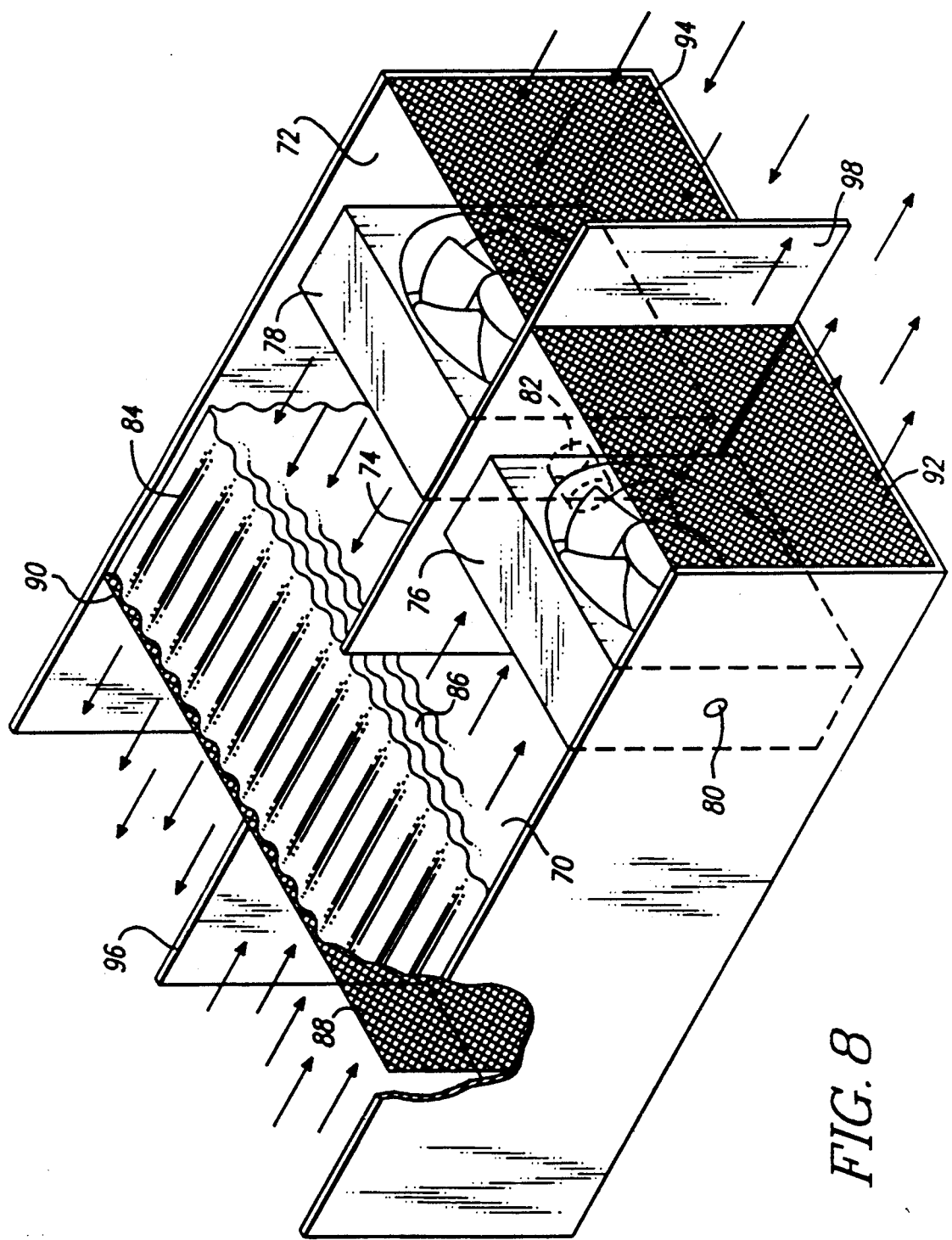
FIG. 8 is a cut away perspective view of an alternate embodiment of the present invention.

The ventilation apparatus 10 of the present invention includes a duct 11, as seen in FIG. 1, which is straight and has openings at a first end 12 and a second end 14. The duct can be made of any suitable material such as a metal or polymer but is preferably made of a material with a high degree of thermal insulation such as a porous plastic material.

Disposed within the duct 11 is a heat exchange matrix 38. The heat storing matrix 38 can be constructed from any suitable material such as steel, paper or cardboard, but is preferably formed from corrugated aluminum. The corrugated aluminum is rolled into a cylinder so that the corrugations form axial passageways through the heat storing matrix 38 for air to flow therethrough. The corrugated aluminum may be treated with a moisture absorbing material such as silica gel to retain moisture contained in the exhausted air. The heat storing matrix serves to retain heat energy from air moving from a warmer to a cooler location and release it when air flow is reversed. Holding the heat storing matrix 38 in place are three retainment rings 37, 39 and 41 as seen in FIG. 1.

Adjacent to the heat storing matrix 38 in the duct 11 is a fan 40 which produces a substantially axial air flow. An important feature of the invention is the manner in which the air flow can be reversed. The fan 40 is pivotally mounted by means of a pin 42 and a solenoid 44 for rotation about an axis transverse to the duct 11 so that the fan may direct air toward first end 12 or second end 14. The fan 40 can be of any type suitable for producing the desired air flow such as the axial type or centrifugal type and should be capable of moving the desired volume of air. For example, in a small apartment a desired air flow would be approximately 50 to 100 cfm. Surrounding the fan 40 is resilient insulating material 46 to provide an airtight seal around the fan 40.

The solenoid 44 is controlled by a timer 50 which energizes the solenoid 44 at a desired time interval. When the solenoid 44 is energized, it causes the fan 40 to rotate to reverse the direction of the air flow. The rotation can be through any angle sufficient to reverse the air flow but is preferably 180 degrees, and is accomplished within a fraction of a second. Preferably, the air flow is reversed every 2-6 seconds, although any appropriate time interval may be chosen.

The first end 12 and second end 14 of the duct 11 have end pieces 20 and 22, respectively, comprising annular rings having openings therethrough as seen in FIGS. 6A and 7A. It will be understood by one skilled in the art that the openings can be of various geometries and are shown as horizontal slots in FIG. 6A and as quarter circles in FIG. 7A for illustration purposes only.

The end piece 20 has an outside surface 21 and an inside surface 23. Similarly, the end piece 22 has an outside surface 25 and an inside surface 27. As seen in FIGS. 6A and 6B, the openings of the end piece 20 are covered by two flexible flaps, an upper flap 16 and a lower flap 18. The upper flap 16 has an attachment edge 24. The attachment edge 24 is connected diagonally across the outside 21 of the end piece 20 so that air flowing in the direction of arrow 1 in FIG. 6B will push the upper flap 16 outward causing it to bend away from the end piece 20 so that the air may flow through the opening in the end piece 20; however, such flow will bear against lower flap 18 preventing its undesired opening. The lower flap 18 also has an attachment edge 28 which is connected to the diameter of the inside surface 23 of the end piece 20, as seen in FIG. 6B. When air flows in the direction of arrow 2 in FIG. 6B, the lower flap 18 bends inward so that air may flow through the opening in the end piece 20, but air flow in the direction of arrow 2 will cause upper flap 16 to close to prevent drafts from entering the room.

The end piece 22 as seen in FIG. 7 has quarter circular flaps 31, 32, 33 and 34 which operate in the same manner as flaps 16 and 18 of the end piece 20 and are attached along horizontal, radial attachment edges 43 and 45 to the inside surface 27 and attachment edges 47 and 49 to the outside surface 25. When air is flowing in the direction of arrow 3 in FIG. 7B, the flaps 33 and 34 bend away from the end piece 22 to allow air to exit from the apparatus. When the air flow is reversed, and flows in the direction of arrow 4 in FIG. 7B, the flaps 31 and 32 bend away from the end piece 22 and allow air to enter the apparatus through the end piece 22.

A hood or end cover 52 is slideably and removably attached to the duct 11 at the end thereof toward the enclosure being ventilated. The hood 52 can be of various shapes and is shown as cylindrical for illustration purposes. A screen 58 can be used to prevent particulates from entering the duct 11. Also, a filter (not shown) can be placed adjacent to the screen 58 for removing dust, pollen or undesirable gases from entering the duct 11. The hood 52 has a horizontal divider 56 which aligns with the attachment edges 24 and 28 of the flaps 16 and 18, respectively. The horizontal divider 56 works in conjunction with the flaps 16 and 18 to ensure that air exhausted from the apparatus is directed away from the end piece 20 and will not be drawn back into the apparatus when the air flow is reversed.

A horizontal divider 54 works in a similar manner as the horizontal divider 56 to direct the air so that outgoing air and incoming air remain separate. A screen 60 can be placed at the second end 14 to prevent particulates from entering the duct 11. Also, a filter (not shown) can be placed adjacent to the screen at the second end 14 to prevent dust, pollen or undesirable gases from entering the duct 11.

In an alternate embodiment, two air exchange units are placed adjacent one another. A duct 70 and a duct 72 share a common dividing wall 74. A fan 76 is disposed within duct 70 suitable for providing substantially axial air flow through duct 70. Similarly, a fan 78 is disposed within duct 72 suitable for providing substantially axial air flow through duct 72. The fans 76 and 78 share a common axis 80. Additionally, a solenoid 82 is disposed between the fans 76 and 78 so that the fans 76 and 78 can be rotated to simultaneously reverse the air flow in ducts 70 and 72. A heat storage matrix 84 is disposed across ducts 70 and 72 and is provided with axial air passages 86 to allow air flow through the ducts 70 and 72. If desired, screens 88, 90, 92 and 94 can be provided to restrict the influx of large particles into the ducts 70 and 72. Additionally, dividers 96 and 98 can be provided to ensure that the air streams entering and exiting the ducts 70 and 72 remain separated.

In operation, the air exchanging apparatus has two modes: an exhaust mode and an intake mode. During the exhaust mode, the fan 40 is pivoted to face the end 14 and air is drawn from the enclosure, in the direction of arrow 2 in FIG. 6B, through the end piece 20, by the fan 40. In the wintertime, the air will be at a warmer temperature inside the enclosure than outside. The air passes through the heat storing matrix 38 and gives up its latent and sensible heat to the heat storing matrix 38. After passing through the heat storing matrix 38, the air flows out the end piece 22 in the direction of arrow 3 in FIG. 7B. When a preselected period of time elapses, the timer 50 energizes the solenoid 44 and the fan 40 is rotated to substantially face end 12, preferably 180 degrees, to reverse the air flow, thus placing the apparatus in the intake mode. In the intake mode, air is drawn from the outside through the end piece 22 in the direction of the arrow 4 in FIG. 7B by the fan 40. The air passes through the fan 40 and into the heat storing matrix 38, where it picks up the heat which was absorbed during the exhaust mode. The air then passes through the end piece 20 in the direction of arrow in FIG. 6B, and into the room.

In the summertime, the air will be at a warmer temperature outside the enclosure than inside. As the air from outside enters the heat storing matrix 38 it gives up its sensible and latent heat to the heat storing matrix 38. After passing through the heat storing matrix 38, the air enters the enclosure. When the air flow is reversed, cool air passes through the heat storing matrix 38 and absorbs the latent and sensible heat from the heat storing matrix 38 and carries it outside. The heat storing matrix 38 can be only sensible heat storing or latent and sensible heat storing. The type that should be selected depends on the conditions present in the enclosure. In homes where in wintertime &he humidity is too high the heat storing matrix should not be the latent type during the winter. During the summertime the sensible heat storing matrix should be replaced with a latent and sensible heat storing matrix.

It will be understood by one skilled in the art that the position of the fan 40 and heat storing matrix 38 are interchangeable. Also, the apparatus could include more than one heat storing matrix if desired.

While the present invention has been described in conjunction with a preferred embodiment, many modifications and variations will be readily apparent to those of ordinary skill in the art. This disclosure and the following claims are intended to cover all such modifications and variations.

What we claim is:

1. Apparatus for exchanging air within an enclosure with outside air, comprising:
    a duct providing air communication between a source of said outside air and said enclosure;
    a heat storing matrix disposed within said duct;
    a single fan disposed within said duct and adapted to produce substantially axial air flow within said duct, said fan being mounted for movement between a first position, wherein air flow is produced from said source of outside air to said enclosure, and a second position, wherein said air flow is reversed; and
    means for moving said fan at preset intervals from said first position to said second position.

2. The apparatus of claim 1 wherein said fan moving means comprises a solenoid which rotates said fan between said first position and said second position.

3. The apparatus of claim 2 wherein said fan, said solenoid and said heat storing matrix may be removed from said duct so that said duct may be cleaned and serviced.

4. The apparatus of claim 1 further comprising means for directing air flow entering and exiting said duct.

5. The apparatus recited in claim 1 wherein said fan and said heat storing matrix may be removed from said duct so that said duct may be cleaned and serviced.

6. The apparatus recited in claim 1 wherein said means for moving said fan from said first position to said second position further includes means for quickly moving said fan.

* * * * *

UNITED STATES PATENT AND TRADEMARK OFFICE
CERTIFICATE OF CORRECTION

PATENT NO. : 5,050,667
DATED : September 24, 1991
INVENTOR(S) : Erling Berner and Rolf E. Berner It is certified that error appears in the above-identified patent and that said Letters Patent is hereby corrected as shown below:

Col. 5, line 34, delete "&he" and substitute --the-- therefor.

Signed and Sealed this

Ninth Day of March, 1993

*Attest:*

STEPHEN G. KUNIN

*Attesting Officer*    *Acting Commissioner of Patents and Trademarks*